United States Patent
König

(10) Patent No.: US 9,626,425 B2
(45) Date of Patent: Apr. 18, 2017

(54) STORAGE SYSTEM, CLOUD STORAGE SYSTEM, AND COMPUTER PROGRAM PRODUCT

(71) Applicant: Fujitsu Technology Solutions Intellectual Property GmbH, München (DE)

(72) Inventor: Christoph König, Ottobrunn (DE)

(73) Assignee: FUJITSU LIMITED, Kawasaki (JP)

( * ) Notice: Subject to any disclaimer, the term of this patent is extended or adjusted under 35 U.S.C. 154(b) by 288 days.

(21) Appl. No.: 14/084,664

(22) Filed: Nov. 20, 2013

(65) Prior Publication Data
US 2014/0143255 A1  May 22, 2014

(30) Foreign Application Priority Data
Nov. 20, 2012  (DE) .................. 10 2012 111 181

(51) Int. Cl.
*G06F 17/30* (2006.01)

(52) U.S. Cl.
CPC .. *G06F 17/30598* (2013.01); *G06F 17/30091* (2013.01)

(58) Field of Classification Search
None
See application file for complete search history.

(56) References Cited

U.S. PATENT DOCUMENTS

| | | | |
|---|---|---|---|
| 7,107,416 B2 | 9/2006 | Stuart et al. | |
| 7,117,322 B2 | 10/2006 | Hochberg et al. | |
| 8,516,022 B1 * | 8/2013 | Kanteti | G06F 17/30188 707/827 |
| 2009/0094205 A1 * | 4/2009 | Malone | G06F 17/30864 |
| 2011/0106771 A1 * | 5/2011 | McDonald | G06F 17/30194 707/663 |
| 2012/0221811 A1 * | 8/2012 | Sparkes | G06F 17/30085 711/159 |
| 2014/0020072 A1 * | 1/2014 | Thomas | H04L 63/0815 726/7 |

OTHER PUBLICATIONS

Author: Mike Scanlin; Title: "Managing Risk in the Cloud"; Date: Oct. 2010; Publisher: NetApp; Pertinent pp. 1-27 (whole document).*
Snaplock Compliance and Snaplock Enterprise www.netapp.de; Network Software (English Translation); Appliance, Inc.; 2006.

* cited by examiner

*Primary Examiner* — Anh Tai Tran
(74) *Attorney, Agent, or Firm* — Fujitsu Patent Center

(57) ABSTRACT

A cloud storage system that includes at least one interface that connects the cloud storage system to a data network, at least one non-volatile mass memory, and at least one control unit connected to the interface and to the at least one mass memory and arranged to 1) receive requests from a user with regard to data objects from the interface according to a data transmission protocol, 2) store data objects transmitted according to a write request in the at least one mass memory and 3) retrieve data objects requested according to a read request from the at least one mass memory, wherein a predetermined storage period is assigned to each data object, stored in the at least one non-volatile mass memory by a write request, at the latest upon receiving the write request, and the stored data objects in a predetermined group cannot be changed by subsequent requests according to the protocol via the interface before expiration of the assigned storage period.

18 Claims, 3 Drawing Sheets

STORAGE SYSTEM, CLOUD STORAGE SYSTEM, AND COMPUTER PROGRAM PRODUCT

TECHNICAL FIELD

This disclosure relates to a storage system, in particular a cloud storage system. The disclosure also relates to a computer program product that operates such a storage system.

BACKGROUND

Storage systems of the above-mentioned type are known. In particular, so-called "cloud storage systems" or appliances, that is to say combinations of hardware and software which make it possible to easily access large quantities of stored data via data networks, in particular the Internet, are known.

Storage systems in general and cloud storage systems in particular have the advantage, inter alia, that the storage of large quantities of data can be centrally managed independently of their processing. In particular, an archiving or access protection mechanism can be jointly provided for all data. In addition, cloud storage systems, in particular, make it possible to outsource the problem of data storage to a specialized service provider.

As described above, storage systems can be used to archive large quantities of data. In the field of long-term data archiving in particular, as is desired from economic points of view, for example, or is required on the basis of legal requirements, cloud storage systems are generally not used, however. This is due to the fact, inter alia, that a user of a cloud storage system generally does not have any knowledge or control of its internal structure and therefore cannot prove the unchanged storage of the data to external bodies, for example, certification bodies. In addition, there is the risk of the data being deleted or changed improperly, for example, in the event of the cloud storage system being hacked via the Internet or negligently, for example, as a result of incorrect operation by a user or administrator.

It could therefore be helpful to provide a storage system, in particular a cloud storage system such that it meets legal requirements and needs of a user for the permanent and secure archiving of large quantities of data.

SUMMARY

I provide a cloud storage system including at least one interface that connects the cloud storage system to a data network, at least one non-volatile mass memory, and at least one control unit connected to the interface and to the at least one mass memory and arranged to 1) receive requests from a user with regard to data objects from the interface according to a data transmission protocol, 2) store data objects transmitted according to a write request in the at least one mass memory and 3) retrieve data objects requested according to a read request from the at least one mass memory, wherein a predetermined storage period is assigned to each data object, stored in the at least one non-volatile mass memory by a write request, at the latest upon receiving the write request, and the stored data objects in a predetermined group cannot be changed by subsequent requests according to the protocol via the interface before expiration of the assigned storage period.

I also provide a computer program product including executable program code stored on at least one non-transient computer-readable storage medium, wherein steps are carried out when the executable program code is executed by a data processing apparatus of a storage system: a write request of a data transmission protocol is received from an interface of the storage system; a unique identifier of a data object assigned to the write request is determined; a check is carried out to determine whether a data object with the determined unique identifier has already been stored in the storage system; if a data object with the determined identifier has already been stored in the storage system, a predetermined storage period assigned to the data object which has already been stored is determined and the determined storage period is compared with a current system time; and the write request is rejected as impermissible if the comparison reveals that the current system time is before an end of the stored predetermined storage period.

I further provide a storage system including at least one interface that connects the storage system to a data network, at least one non-volatile mass memory, and at least one control unit connected to the interface and to the at least one mass memory and is arranged to 1) receive requests from a user with regard to data objects from the interface according to a data transmission protocol, 2) store data objects transmitted according to a write request in the at least one mass memory and 3) retrieve data objects requested according to a read request from the at least one mass memory, wherein a predetermined storage period is assigned to each data object, stored in the at least one non-volatile mass memory by a write request, at the latest upon receiving the write request, and the stored data objects in a predetermined group cannot be changed by subsequent requests according to the protocol via the interface before expiration of the assigned storage period.

LIST OF REFERENCE SYMBOLS

Figure 1:
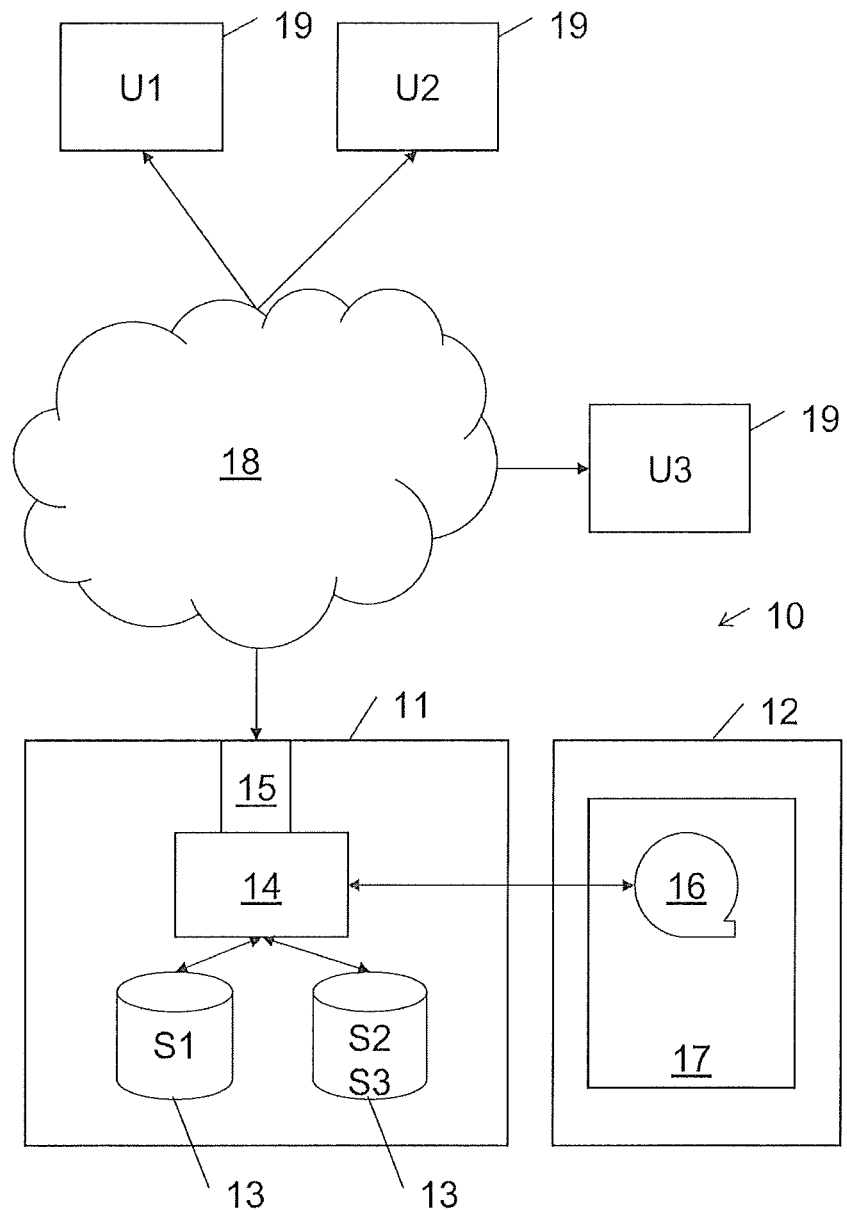
FIG. 1 shows a schematic illustration of an example of my storage system.

10 Storage system
11 Server system
12 Tape storage system
13 Hard disk mass memory
14 Control unit
15 Interface
16 Tape drive
17 Tape robot
18 Data network
19 Client computer
21 Storage structure
22 Bucket
23 Data object
24 Object identifier
25 Attribute
31 Storage structure
32 File
33 File system
34 Data
35 Header area
40 Operating method 41-48 Method steps
D1, D2 Data objects
S1, S2, S3 Storage areas
T1, T2 Storage periods
U1, U2, U3 Users

DETAILED DESCRIPTION

I provide a storage system comprising at least one interface for connecting the storage system to a data network, at least one non-volatile mass memory and at least one control unit which is connected to the interface and to the at least one mass memory. In this case, the control unit of the storage system is set up to receive requests from a user with regard to data objects from the interface according to a data transmission protocol, to store data objects transmitted according to a write request in the at least one mass memory and to retrieve data objects requested according to a read request from the at least one mass memory. In this case, a predetermined storage period is assigned to each data object in a predetermined group, stored in the at least one non-volatile mass memory by a write request, at the latest upon receiving the write request. The stored data objects cannot be changed by subsequent requests according to the protocol via the interface before expiration of the assigned storage period.

Providing an attribute, the predetermined storage period, which is assigned to the data objects in the predetermined group, means that protection of the data objects stored in the storage system can be ensured by the control unit and can also be documented if necessary. Protection may be applied, for example, to all data objects stored in the storage system or to predetermined groups and/or types of data objects, for example, all data objects associated with a user or all data objects stored at a particular storage location. On the basis of the storage and monitoring of the storage period, it is possible to contractually agree, with an operator of the storage system, in particular an operator of a cloud storage system, comprehensible security mechanisms which meet the different legal or other regulatory requirements.

The storage system may be characterized in that the data objects stored in the at least one mass memory are stored in a plurality of buckets, wherein each bucket is assigned a storage period for the data objects stored therein. Combining data objects with a common storage period in a bucket simplifies a simple check of the storage period for the operator of the storage system and simplifies organization of data objects with different storage periods for the user.

Alternatively, the data objects stored in the at least one mass memory are files stored in a file system, wherein the file system comprises at least one file attribute for files stored therein, in which attribute the storage period is stored. Such a file system enables particularly flexible storage of a predetermined storage period, which storage is specific to each file.

The data transmission protocol may also comprise a deletion request, a renaming request, an attribute change request and/or an overwrite request, wherein the at least one control unit is also set up to reject a write request, a deletion request, an attribute change request and/or an overwrite request for a data object already stored in the at least one mass memory and/or to transmit an error message to a sender of the request in response to the respective request. Such an expansion of the control unit makes it possible to use the storage system with already known data transmission protocols, wherein semantically impermissible requirements are possibly rejected by the control unit with an error message.

The at least one control unit may also be set up to determine the storage period of a data object on the basis of an end date predefined before or with the reception of a write request. The stipulation of a predetermined end date by the user, for example, together with a write request or with a general configuration request to the storage system, enables the simple, user-controlled specification of the storage period.

The at least one control unit may also be set up to determine the storage period of a data object on the basis of a predefined storage duration and a beginning of storage given by the reception of a write request. Such partially dynamic determination makes it possible to stipulate, for each newly protected data object, an individual storage period which meets a predefined regulatory requirement or contractual provision.

Further advantageous features are disclosed in the appended claims and in the following detailed description of examples.

My storage systems and computer program products are described in detail below using different examples and with reference to the appended Drawings:

FIG. 1 schematically shows a storage system 10. In the example illustrated, the storage system 10 comprises a server system 11 and a tape storage system 12. The server system 11 comprises two hard disk mass memories 13, a control unit 14 and an interface 15. In the example, the tape storage system 12 comprises a tape drive 16 which can be fitted with different magnetic storage tapes using a tape robot 17. The server system 11 and the tape storage system 12 together make it possible to permanently, redundantly store comprehensive data. In this case, the tape storage system 12 ensures, in particular, the long-term security of the stored data, while the server system 11 is used to rapidly respond to requests from a user of the storage system 10.

Although the respective components are illustrated only singly in FIG. 1 for reasons of clarity, many storage systems in practice comprise a multiplicity of server systems 11, hard disk mass memories 13, control units 14 and/or interfaces 15 to improve their performance and establish redundancy. As an alternative or in addition to the tape storage system, one or more other systems and storage media may likewise be used for the long-term storage of the data. However, the exact configuration of the storage system 10 and the mass memories arranged therein or connected thereto is of subordinate importance to the further explanation and, therefore, has a purely exemplary character.

The storage system 10 is coupled to a data network 18 via the interface 15, for example, a network interface to a general data transmission network or a host adapter to connect the server system 11 to a special storage network. In the example, the data network 18 is the Internet, in particular. Alternatively, however, it may also be a closed data network 18, for example, a company-internal data network.

Different users may use client computers 19 to access the data stored in the storage system 10 via the data network 18. In the example illustrated in FIG. 1, three different users U1, U2 and U3 have recourse to different storage areas S1, S2, S3 of the hard disk mass memory systems 13 assigned to them. The storage areas S1, S2 and S3 used by the respective users U1, U2 and U3 are contractually pledged to them. In this case, a predetermined storage period for the data stored in the storage system 10 may be stipulated as early as when concluding the contract.

Figure 2:
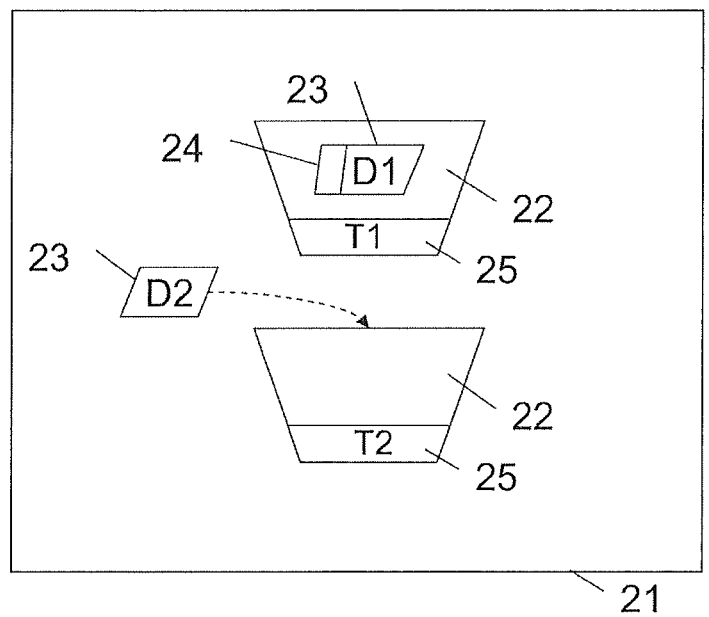
FIG. 2 shows a schematic illustration of a first storage structure.

FIG. 2 shows a first possible storage structure 21 of a storage area S1 assigned to a user U1 of the storage system 10. In the example, the storage area S1 comprises so-called buckets 22 in which data objects 23 are combined with a common storage period T1 or T2. To address the individual data objects, each data object 23 has a unique object identifier 24. Each bucket 22 is also assigned an attribute 25 in which the predetermined storage period T1 for all data objects 23 stored in the associated bucket 22 is stored.

If the control unit 14 receives a request with respect to a data object 23, for example, the data object D1 according to FIG. 2, from a client computer 19 via the interface 15, which request requires the data object 23 to be deleted or modified, the control unit 14 first of all compares a current time with the predetermined storage period T1 stored in the attribute 25. For example, the date of the creation of the bucket 22, the date of the creation of the data object 23, a date on which the protective mechanism was activated for the first time for the bucket 22, or a date on which the data object 23 was moved into the bucket 22 may be compared with the current date to determine whether the storage period T1 has already been reached. If the storage period T1 stored in the attribute 25 has not yet been reached, the request is not carried out and an error message is transmitted back to the requesting client system 19.

If the control unit 14 receives a write request with respect to a data object 23 to be newly created, for example, a data object D2 for storage in the bucket 22, from the client computer 19 via the interface 15, the control unit 14 stores the new data object 23 in the bucket 22 and therefore implicitly assigns the storage period T2 to the new data object 23. Subsequent deletion or modification of the newly stored data object 23 is then prevented by the control unit 14 until the storage period T2 has been reached. The date on which the data object 23 was first written to the bucket 22 or the first time the protective mechanism for the bucket 22 was activated can preferably be retrieved by the user and/or an external inspection entity in order to be convinced of the minimum duration of unchanged storage.

The storage area S1 can be organized very easily by the operator of the storage system 10 or a user U1 of the storage area S1. For example, the user U1 can create a separate bucket 22 for each financial year. A suitable storage period of for example, 3, 5 or 10 years after the end of the financial year may be selected according to the legal specifications. Fiscally relevant documents are then stored in the associated bucket 22 and remain protected for the legally predefined storage time.

Figure 3:
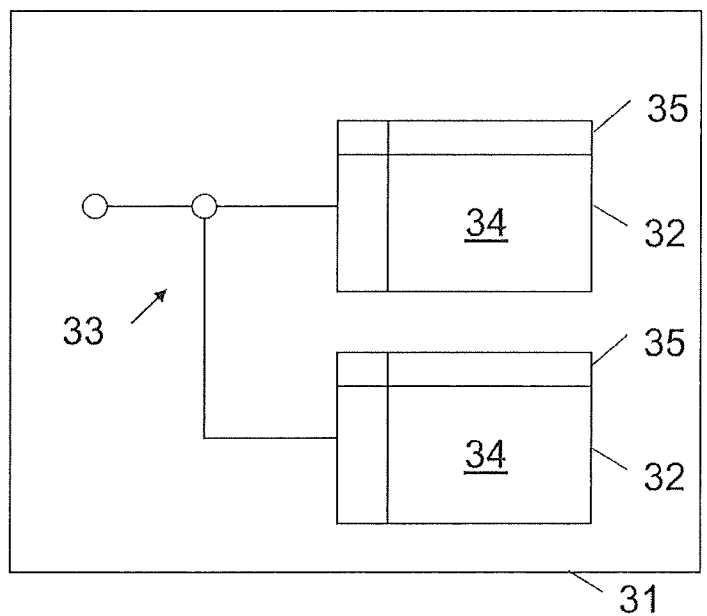
FIG. 3 shows a schematic illustration of a second storage structure.

FIG. 3 shows an alternative storage structure 31 for a storage area S2 assigned to a user U2. According to FIG. 3, individual data objects are stored in the form of files 32 associated with the user U2 in a hierarchical file system 33. In addition to the actual data 34, each file 32 contains a header area 35 containing meta data for the stored file 32.

In the example, the header area 35 comprises, in particular, entries for a last write, read and access date. Whereas the entries for the write and read dates are used to record the last write or read access to a file 32 in a known manner, the access date is used to store a file-specific expiry of a storage period. For this purpose, either a specific end date can be predefined together with a write request or an end date can be dynamically determined by the control unit 14 on the basis of a contractually pledged minimum storage period and a writing period and can be stored in the header area 35. Subsequent deletion or overwrite requests are rejected before the stored access time is reached.

In addition, it is also possible to provide other or further file attributes, for example, an attribute for storing a time at which the described protective mechanism was activated for the first time for a file 32. For example, it is possible to store differing times for the creation of the file 32 and for the protection start date before changes. In this manner, the storage system 10 can therefore disclose the minimum period for which the file 32 has been stored in unchanged form. Such file attributes or other meta information may be provided for inspection entities, for example, a certification body of a state inspection authority via an interface provided only with read rights in order to make it possible to externally check the minimum storage duration.

Figure 4:
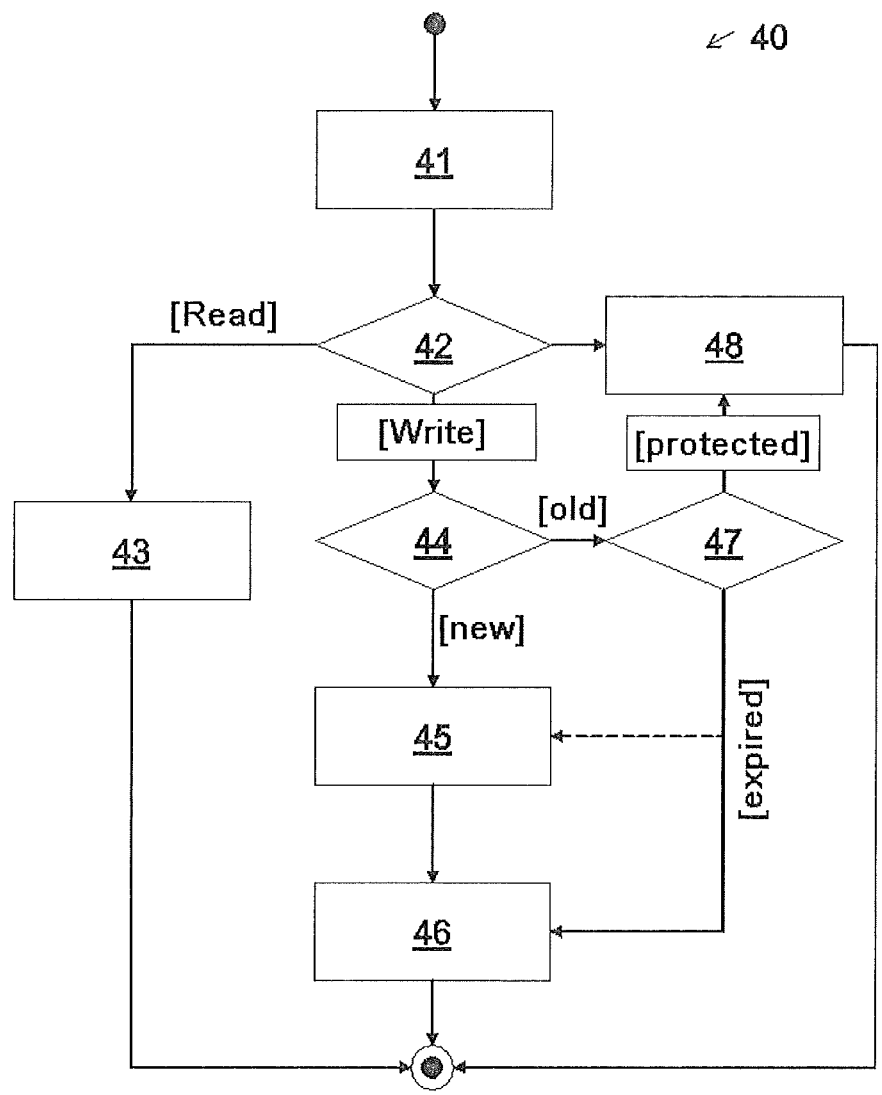
FIG. 4 shows a flowchart of an operating method for a storage system.

An operating method 40 for the storage system 10 is described below using the flowchart according to FIG. 4. In a step 41, the control unit 14 receives a request according to a data transmission protocol via the interface 15. Examples of such protocols are, inter alia, the protocol of the so-called "Amazon Simple Storage Service (S3)" and the protocol according to the Cloud Data Management Interface (CDMI) for access to remote storage services. Such protocols generally provide for the transmission of a user identifier and authorization for checking authorization of the user. In the example, the authorization of the user U1, U2 or U3 is therefore checked and assignment to a predetermined storage area S1, S2 or S3 of the storage system 10 is possibly carried out in step 41.

In a subsequent step 42, a check is carried out to determine what type of request is involved. If it is a read request which is irrelevant to the unchanged storage of the data, this request is answered in a manner known per se without a further check in step 43.

In contrast, if it is a write request, a check is first of all carried out in a subsequent step 44 to determine whether a data object 23 with a corresponding identifier, for example, a predefined file name and path or a predefined object identifier 24, has already been stored for the user U1, U2 or U3. If this is not the case, a storage period is determined in step 45 for the data object 23 to be newly written. For example, the storage period may be implicitly predefined by the storage location, as was described above using the storage structure 21.

Alternatively, the storage period may be explicitly transmitted to the control unit 14 with the storage request and may be recorded in a suitable file attribute, as was described above using the second storage structure 31. Depending on the protocol used, the storage period may be transmitted by a request preceding the actual write request and containing control information or may be transmitted as part of the write request itself.

Finally, the storage period may also be dynamically determined. For example, a predetermined storage duration may be predefined for each user U1, U2 and U3, for each storage area S1, S2 and S3 and/or for each storage location predefined by a bucket 22 or a path of a file system 33, which storage duration is used to dynamically determine an end of a storage period starting from the time of the write request.

The transmitted data are then written in a manner known per se, in step 46, to that storage area S1, S2 or S3 of the storage system 10 which is assigned to the user U1, U2 or U3.

Otherwise, that is to say, for example, if a data object 23 with the same identifier already exists in the storage area S1 associated with the user U1, a check is first of all carried out in a further step 47 in order to determine whether a storage period stored for the data object 23 has already been reached. If this is the case, the data object can be overwritten, which is carried out in step 46. Optionally, a new storage period may first of all be stipulated for the overwritten data object in step 45. Otherwise, the control unit 14 generates an error message in step 48 and rejects the request from the user U1.

Further requests from a user U1, U2 or U3 are rejected in a similar manner in step 48 with an error message if they relate to the change or renaming of a data object 23, a predetermined attribute assigned to a data object 23 or the deletion of the data object 23 before the predetermined storage period. Amendments to file attributes, in particular the data in a header area 35, may be allowed in this case as long as they only extend a predetermined storage period or relate to meta data which are irrelevant to the long-term storage of the state of the file 32 for the agreed storage period. For example, it is possible to amend an attribute regarding the last reading of a file 32 according to the actual read access operations. In contrast, amendments to the date of the last write access or to the attribute 25 for storing a storage period itself are not permissible before expiry of the predetermined storage period.

With the described apparatus and the described operating method 40, a user U1, U2 or U3 of a storage system 10, in particular a cloud storage system, can prove that the data stored by him have not been changed for a regulatory predefined storage period, for example. In this case, it is advantageous that the control device 14 with the associated interface 15 precludes inadvertent or malicious deletion of data to be permanently stored from the outset. The storage system 10 therefore effectively constitutes a so-called WORM ("Write Once Read Multiple") storage medium for the user U1, U2 or U3. In this case, the described method can be applied either to all data objects 23 or predetermined groups of files, for example, all data objects 23 in a bucket 22.

If, contrary to the previously stipulated storage duration, a user U1, U2 or U3 of the storage system 10 would not like to store data for a relatively long time with an operator of the storage system 10, there is a need for further action to jointly delete all data assigned to the user U1, U2 or U3 or all data in a group with a common storage duration. The deletion is not possible via the interface 15 and/or the data transmission protocol used and can accordingly be additionally protected.

For example, an express confirmation by at least two persons via a separate communication channel, for instance a telephone call with password transmission or a written termination of a service contract, may be required to completely delete an entire storage area S1, S2 or S3 assigned to a user U1, U2 or U3. In this case, a specially authorized person, for example, an administrator of the storage system 10, may irrevocably delete the storage area S1, S2 or S3 using a local administration interface, for example.

The invention claimed is:

1. A cloud storage system comprising:
   at least one first interface that connects the cloud storage system to a data network arranged to receive requests from a user with regard to data objects of a predetermined group of data objects according to a data transmission protocol;
   at least one second interface arranged to authorize a deleting of the predetermined group of data objects, wherein the second interface cannot be addressed via the data network and/or the data transmission protocol;
   at least one non-volatile mass memory; and
   at least one control unit connected to the first interface and to the at least one mass memory and arranged to 1) receive the requests from the user with regard to data objects of the predetermined group of data objects from the first interface according to data transmission protocol, 2) store data objects transmitted according to a write request in the at least one mass memory and 3) retrieve data objects requested according to a read request from the at least one mass memory, wherein a predetermined storage period is assigned to each data object in the predetermined group of data objects,
   the assigned predetermined storage period begins at the time a data object is stored in the at least one non-volatile mass memory by a corresponding write request and includes an end date, the end date being predetermined or based on the corresponding write request,
   the stored data objects in a predetermined group cannot be changed by subsequent requests according to the protocol via the first interface before expiration of the assigned predetermined storage period, and
   the entire predetermined group of the data objects will be deleted after receiving confirmation from at least one authorized person through the second interface.

2. The cloud storage system according to claim 1, wherein the data objects stored in the at least one mass memory are stored in a plurality of buckets, and each bucket is assigned a storage period for the data objects stored therein.

3. The cloud storage system according to claim 1, wherein the data transmission protocol comprises a deletion request, a renaming request, an attribute change request and/or an overwrite request, and the at least one control unit is also arranged to reject a write request, a deletion request, an attribute change request and/or an overwrite request, received before expiration of the assigned predetermined storage period assigned to the data object, for a data object already stored in the at least one mass memory and/or to transmit an error message to a sender of the request in response to the respective request.

4. The cloud storage system according to claim 1, wherein the at least one control unit is also arranged to check an authorization of the user to make requests and execute said requests only when the user has been successfully authorized.

5. The cloud storage system according to claim 1, wherein the data network is the Internet.

6. The cloud storage system according to claim 1, wherein the confirmation is by at least two persons via a separate communication channel is required before the entire predetermined group of data objects will be deleted.

7. The cloud storage system according to claim 1, wherein the confirmation is provided by means of a telephone call with password transmission.

8. The cloud storage system according to claim 1, wherein the entire predetermined group of data objects corresponds to at least one of a group of data objects with a common predetermined storage duration, and a storage area assigned to a selected user of the cloud storage system.

9. A computer program product comprising executable program code stored on at least one non-transitory computer-readable storage medium, wherein steps are carried out when the executable program code is executed by a data processing apparatus of a storage system that connects the storage system to a data network:
   a write request of a data transmission protocol is received from a first interface of the storage system that connects the storage system to the data network;
   a unique identifier of a data object of a predetermined group of data objects assigned to the write request is determined;

a check is carried out to determine whether a data object with the determined unique identifier has already been stored in the storage system;

if a data object with the determined identifier has not yet been stored in the storage system, a predetermined storage period is assigned to the data object of the predetermined group of data objects, the assigned predetermined storage period begins at the time the data object is stored in the storage system by a corresponding write request and includes an end date, the end date being predetermined or based on the corresponding write request, if a data object with the determined identifier has already been stored in the storage system, the end date of the assigned predetermined storage period assigned to the data object is determined and compared with a current system time; and the write request is rejected as impermissible if the comparison reveals that the current system time is before the end date;

if a delete request of the data transmission protocol for the data object identified by the unique identifier is received from the first interface of the storage system, the end date of the assigned predetermined storage period assigned to the data object is determined and compared with a current system time, and the delete request is rejected as impermissible if the comparison reveals that the current system time is before the end date;

and if a delete request for the entire predetermined group of data objects is received and confirmed by at least one authorized person through a second interface of the storage system that cannot be addressed via the data network and/or the data transmission protocol, the predetermined group of data objects is deleted.

10. The computer program product according to claim 9, wherein steps are carried out by a data processing apparatus of a cloud storage system comprising:

at least one interface including the first interface that connects the cloud storage system to the data network;

at least one non-volatile mass memory; and at least one control unit connected to the first interface and to the at least one mass memory and arranged to 1) receive requests from a user with regard to the data objects of the predetermined group of data objects from the first interface according to the data transmission protocol, 2) store data objects transmitted according to a write request in the at least one mass memory and 3) retrieve data objects requested according to a read request from the at least one mass memory, and the stored data objects in the predetermined group cannot be changed by subsequent requests according to the protocol via the interface before expiration of the assigned predetermined storage period.

11. A storage system comprising:

at least one interface that connects the storage system to a data network;

at least one non-volatile mass memory; and at least one control unit connected to the interface and to the at least one mass memory and arranged to 1) receive requests from a user with regard to data objects from the interface according to a data transmission protocol, 2) store data objects transmitted according to a write request in the at least one mass memory and 3) retrieve data objects requested according to a read request from the at least one mass memory, wherein a predetermined storage period is assigned to each data object, stored in the at least one non-volatile mass memory by a write request, at the latest upon receiving the write request, and the stored data objects in a predetermined group cannot be changed by subsequent requests according to the protocol via the interface before expiration of the assigned storage period, the storage system further comprising a local administration interface that administers the storage system, wherein the local administration interface cannot be addressed via the data network and/or the data transmission protocol, and the local administration interface provides an administration function that deletes all data objects in the group.

12. The storage system according to claim 11, wherein the data objects stored in the at least one mass memory are files stored in a file system, and the file system comprises at least one file attribute for files stored therein, which attribute can be used to determine the predetermined storage period.

13. The storage system according to claim 11, wherein the at least one control unit is also arranged to determine the storage period of a data object on the basis of an end date predefined before or with reception of a write request.

14. The storage system according to claim 11, wherein the at least one control unit is also arranged to determine the storage period of a data object on the basis of a predefined storage duration and a beginning of storage given by reception of a write request.

15. The storage system according to claim 11, wherein the at least one control unit is also arranged to check an authorization of the user to make requests and execute said requests only when the user has been successfully authorized.

16. The storage system according to claim 12, wherein the file system comprises an attribute for storing a minimum duration and/or an unchangeability end date, and the control unit is arranged to 1) retrieve the attribute of the minimum duration or the unchangeability end date for a file in the file system upon receiving a write request, 2) compare said attribute with a current time and 3) reject the write requests if the stored minimum duration or the unchangeability end date is after the current time.

17. A cloud storage system comprising:

at least one interface to connect the cloud storage system to a data network, at least one non-volatile mass memory, at least one control unit connected to the interface and the at least one mass memory and which 1) receives requests from a user with regard to data objects from the interface according to a data transmission protocol, 2) stores data objects transmitted according to a write request in the at least one mass memory and 3) retrieves data objects requested according to a read request from the at least one mass memory, wherein a predetermined storage period is assigned to each data object, stored in the at least one non-volatile mass memory by a write request, at the latest upon receiving the write request, and the stored data objects in a predetermined group cannot be changed by subsequent requests according to the protocol via the interface before expiration of the assigned storage period, and a local administration interface that administers the cloud storage system, wherein the local administration interface cannot be addressed via the data network and/or the data transmission protocol, and wherein the local administration interface provides an administration function that irrevocably deletes all data objects in the group.

18. The cloud storage system according to claim 17, wherein the at least one control unit is also arranged to determine the storage period of a data object on the basis of a predefined storage duration and a beginning of storage given by reception of a write request.

* * * * *